B. S. BROWN.
Hand-Pieces of Dental-Engines.
No. 213,167.  Patented Mar. 11, 1879.
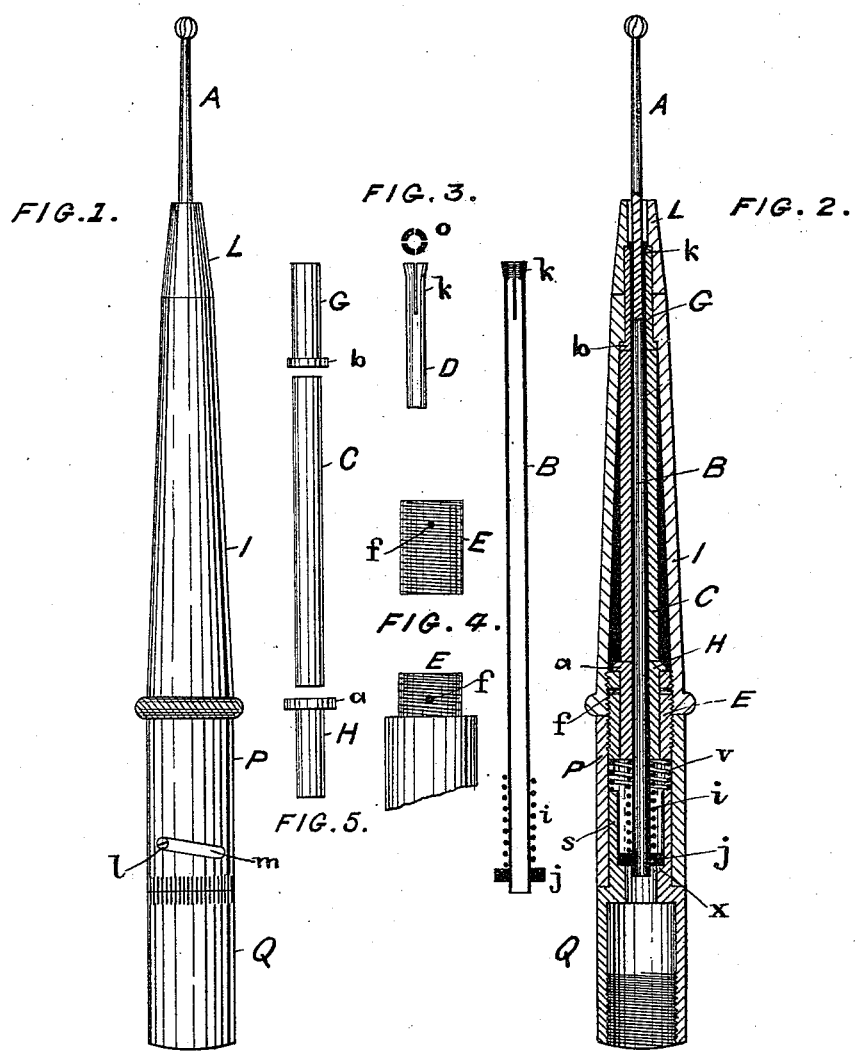
WITNESSES.  INVENTOR.

UNITED STATES PATENT OFFICE.

BENONI S. BROWN, OF NEW YORK, N. Y.

IMPROVEMENT IN HAND-PIECES OF DENTAL ENGINES.

Specification forming part of Letters Patent No. 213,167, dated March 11, 1879; application filed December 20, 1878.

*To all whom it may concern:*

Be it known that I, BENONI S. BROWN, of the city, county, and State of New York, have invented certain new and useful Improvements in the Hand-Pieces of Dental Engines; and I do hereby declare the following to be such a full, clear, concise, and exact description as will enable any one skilled in the art or science to which it appertains or with which it is most nearly connected to make and use the same, reference being had to the accompanying drawings, making part of this specification, and to the several figures and letters of reference marked thereon, as hereinafter described.

The object of these improvements is to more effectually and permanently secure the operating-tool in the hand-piece, to increase the durability and general firmness of the hand-piece itself, and to facilitate its repair.

The dental hand-piece is an instrument well known to those skilled in the art and science of dentistry, and to those skilled in the art of manufacturing dental instruments. I will not, therefore, in describing these improvements, give a full detail description of a dental hand-piece, but confine myself to a description of the parts, and their application, comprising my invention.

By Figure 1 of the drawings is shown an external view of the hand-piece ready for use. Fig. 2 illustrates a longitudinal vertical section through the same; and Figs. 3, 4, and 5 show detail parts, to be hereinafter referred to and explained.

In Figs. 1 and 2, A is the operating-tool. By B, Fig. 3, is shown the tool-holder that carries the tool. By G and H of Fig. 5 are shown the journals that support and carry the tool-holder; and by C of Fig. 5 is shown a connecting-tube, to which the journals are united or held in position.

To permanently hold the tool A firmly in the holder that carries it, and to permanently hold the spindle snugly in its journals, and keep the joints of the case tight and firm, are the principal points of the invention.

The spindle is a composition one, and consists of the tool-holder B, and the journals G and H, held apart by a tube, c. The end of the tool-holder is slotted and enlarged, as shown by $k$ and $o$, and in it the shank of the tool is inserted in the ordinary way. Upon the opposite end of the spindle, or near its end, a collar, $j$, is made, and around the spindle, under this collar, a helical spring, $i$, is wound. The journals H and G are united to the connecting-tube $c$ by soft solder. It is not necessary that these parts be soldered together; but I prefer to have them so. The tube with its journals are now slipped over the split end of the tool holder or clutch, and shoved down against the spring $i$. In doing so the jaws of the clutch $k$ are contracted or forced to the center, and are kept so until, by forcing the tube-journals down upon the spring, the end of the tool-holder protrudes beyond the end of the journal G or chuck, by which the jaws of the clutch are released and the shank of the tool is inserted. The spring $i$ then with a constant force presses the end of the journal G or chuck against and upon the enlargement or cone on the jaws of the tool-holder, and maintains a constant and uniform grasp upon the shank of the tool, holding it firmly, notwithstanding the wear and reduction of the parts in contact, as long as the spring has energy enough to force the tube or chuck upon the cone of the clutch.

The lower end of the journal-box (the chuck) should, of course, be fitted to the shape of the enlargement or cone on the clutch, and the parts in contact should be made of steel, tempered hard and polished smoothly.

I have shown how the tool is griped and permanently held in the jaws of the clutch by the constant force of the spring drawing it within the embrace of the chuck.

The manner in which the spring is made to release the shank of the tool is as follows: The case of the instrument consists of four parts, L I P Q. The parts I and P are united by means of a tubular screw-nipple or journal-box, E, upon which a left-hand thread is cut, and in which the journal H of the spindle is carried, the lower end of the nipple forming a shoulder, against which the thrust-collar of the journal rides. The part Q of the case is made with a shank, S, that is snugly fitted into the part P, and yet loose enough to admit of being turned by the hand. In this shank a screw-pin, $l$, is fitted and arranged in a cam-slot, $m$, cut in the part P, so that upon turning the part Q the length of the cam-slot it will advance in or out of the part P a distance equal to the pitch of the cam. The shank of the part Q is also made to slip over and embrace the collar $j$ on the end of the tool-holder B, upon which a shoulder, H, of the shank rides. Now, if the part Q be turned to the left to bring the pin $l$ in the left end of the cam-slot, the spindle will be forced forward by the shoulder X upon the collar $j$ of the spindle, and the shank of the tool A will be released; but by turning the part Q to the right, so as to bring the pin $l$ in the opposite end of the cam-slot, the spring will force back the spindle, and draw the clutch in the end of journal G or chuck, and close the jaws of the clutch on the shank of the tool A.

To insure the effectual operation of the parts, as above described, the collars $a$ and $b$ on the journals G H should be snugly held between the end of the nipple E and a corresponding shoulder in the lower end of the case I.

To avoid all lost motion or slack adjustment at these points is the object of the screw-nipple or journal-box, by which the wear between the shoulders and the collars can be readily compensated for, and the lost motion taken up by merely screwing down the nipple or screw-journal box far enough to take up the slack, a hole, $f$, being made in the nipple to receive the end of a rod, to screw it up or down, as may be required.

The screw-thread on the nipple is cut to the left, that its position may not be affected by the rotation of the spindle in it.

To press back the part Q of the case and keep it from too readily turning upon the cam-pin $l$, or feeling loose in the hand, a spring, $v$, is inserted under the end of its shank, and over the spring $i$ upon the end of the nipple, by which all misplacement or undue looseness is avoided.

Having thus described the nature and extent of my invention, I claim and desire to secure by Letters Patent—

1. A dental hand-piece fitted with a split tool-holder, B, combined with a spring, $i$, arranged to constantly draw or force the tool-clutch within the embrace of the chuck, by which the tool is firmly griped and held in position.

2. A dental hand-piece fitted with a split tool-holder, B, combined with a cam, $m$, cut in the case and fitted with a pin, as described, arranged to act on the tool-holder and force its split end out of the embrace of the chuck and release the tool.

3. In a dental hand-piece, the tubular screw-nipple E, in combination with the upper part of the case and the upper journal of the spindle, by which the lost motion of the spindle endwise can be taken up by the adjustment of the journal-box, in which it is supported.

4. A dental hand-piece in which the two journals that carry the spindle are made separate and distinct, and are held in position endwise by an intervening tube, so that old boxes can be readily replaced by new ones.

BENONI S. BROWN.

Witnesses:
  WILLIAM H. BROADNAX,
  AMOS BROADNAX.